United States Patent
Perez et al.

(10) Patent No.: US 8,691,169 B2
(45) Date of Patent: Apr. 8, 2014

(54) METHOD FOR THE PRODUCTION OF BATTERY GRADE LITHIUM CARBONATE FROM NATURAL AND INDUSTRIAL BRINES

(71) Applicant: Minera Exar S.A., Mendoza (AR)

(72) Inventors: Waldo Perez, Mendoza (AR); Hugo Adan Carlos Barrientos, Santiago (CL); Claudio Suarez, Ontario (CA); Marcelo Bravo, Antofagasta (CL)

(*) Notice: Subject to any disclaimer, the term of this patent is extended or adjusted under 35 U.S.C. 154(b) by 0 days.

(21) Appl. No.: 13/627,089

(22) Filed: Sep. 26, 2012

(65) Prior Publication Data

US 2013/0101484 A1    Apr. 25, 2013

(30) Foreign Application Priority Data

Oct. 24, 2011    (AR) .............................. 20110103922

(51) Int. Cl.
   C22B 26/00    (2006.01)
(52) U.S. Cl.
   USPC ........ 423/179.5; 423/421; 423/164; 423/158; 423/166; 423/277
(58) Field of Classification Search
   USPC ............... 423/158, 164, 166, 179.5, 277, 421
   See application file for complete search history.

(56) References Cited

U.S. PATENT DOCUMENTS

| | | | |
|---|---|---|---|
| 4,036,713 A | * | 7/1977 | Brown .......................... 205/536 |
| 4,036,718 A | | 7/1977 | Brown et al. |
| 4,243,392 A | | 1/1981 | Brown et al. |
| 4,261,960 A | | 4/1981 | Boryta |
| 4,859,343 A | | 8/1989 | Frianeza-Kullberg et al. |
| 4,980,136 A | | 12/1990 | Brown et al. |
| 5,219,550 A | | 6/1993 | Brown et al. |
| 5,993,759 A | | 11/1999 | Wilkomirsky |
| 6,048,507 A | | 4/2000 | Amouzegar |
| 6,921,522 B2 | | 7/2005 | Boryta et al. |
| 7,157,065 B2 | | 1/2007 | Boryta |
| 8,287,829 B2 | | 10/2012 | Harrison |
| 2012/0189516 A1 | | 7/2012 | Donaldson |

FOREIGN PATENT DOCUMENTS

WO    2010/006366    *    1/2010

* cited by examiner

Primary Examiner — Steven Bos

(74) Attorney, Agent, or Firm — Robert L. Stearns; Dickinson Wright, PLLC

(57) ABSTRACT

It is possible to produce battery grade metallic lithium from naturally occurring or industrial brine by a process comprising the following steps: (i) precipitating magnesium with calcium hydroxide; (ii) removal of boron via extraction of solvents; (iii) precipitation of lithium with sodium carbonate; (iv) transformation of lithium carbonate to bicarbonate of lithium with carbonic acid; (v) decomposition of bicarbonate of lithium into high purity lithium carbonate as a result of heating of the solution.

Re-precipitation of lithium carbonate by the formation of bicarbonate of lithium allows for the removal of the majority of contaminants which co-purify with lithium carbonate and yield battery grade highly purified lithium carbonate.

14 Claims, 2 Drawing Sheets

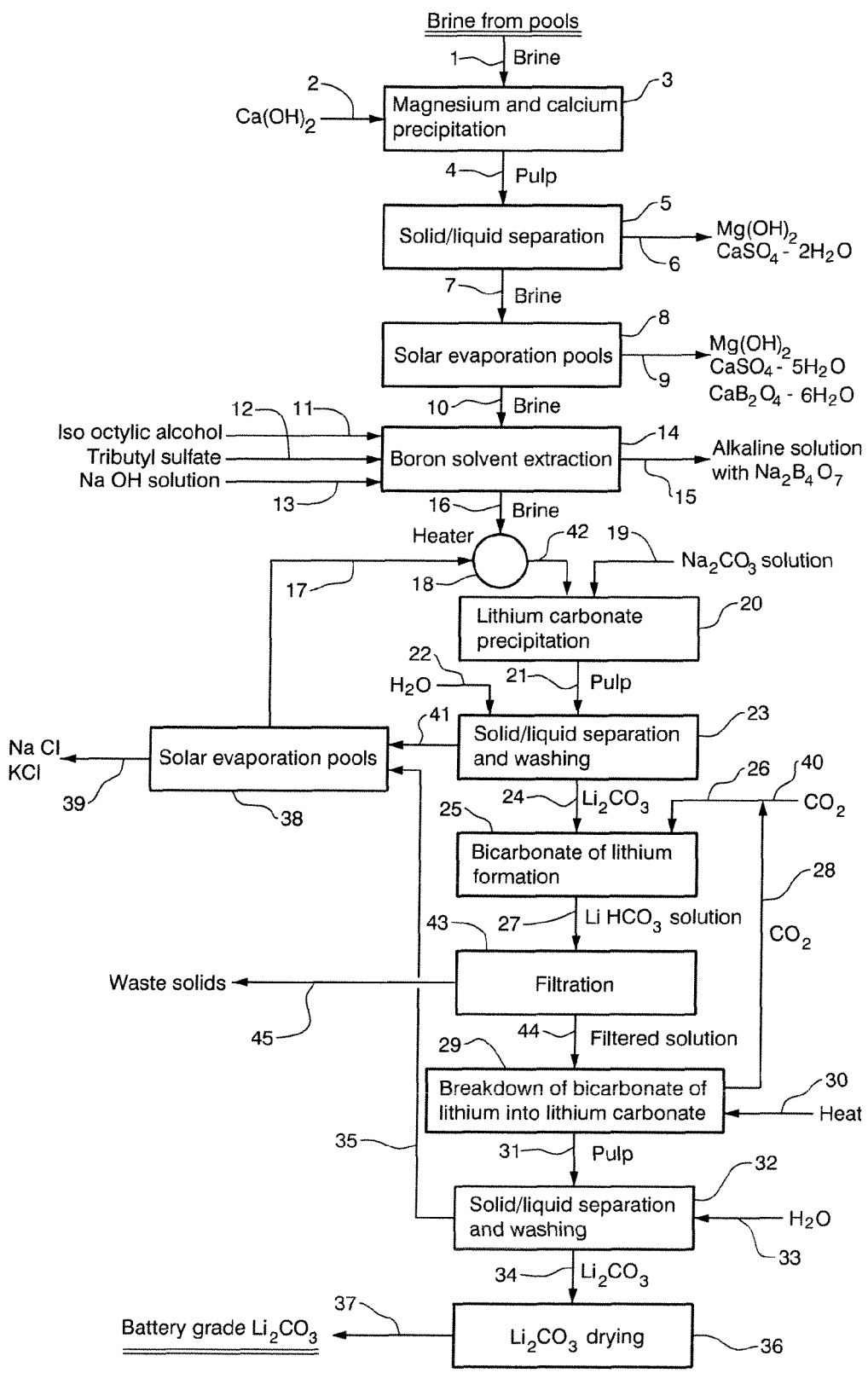
Figure No. 1

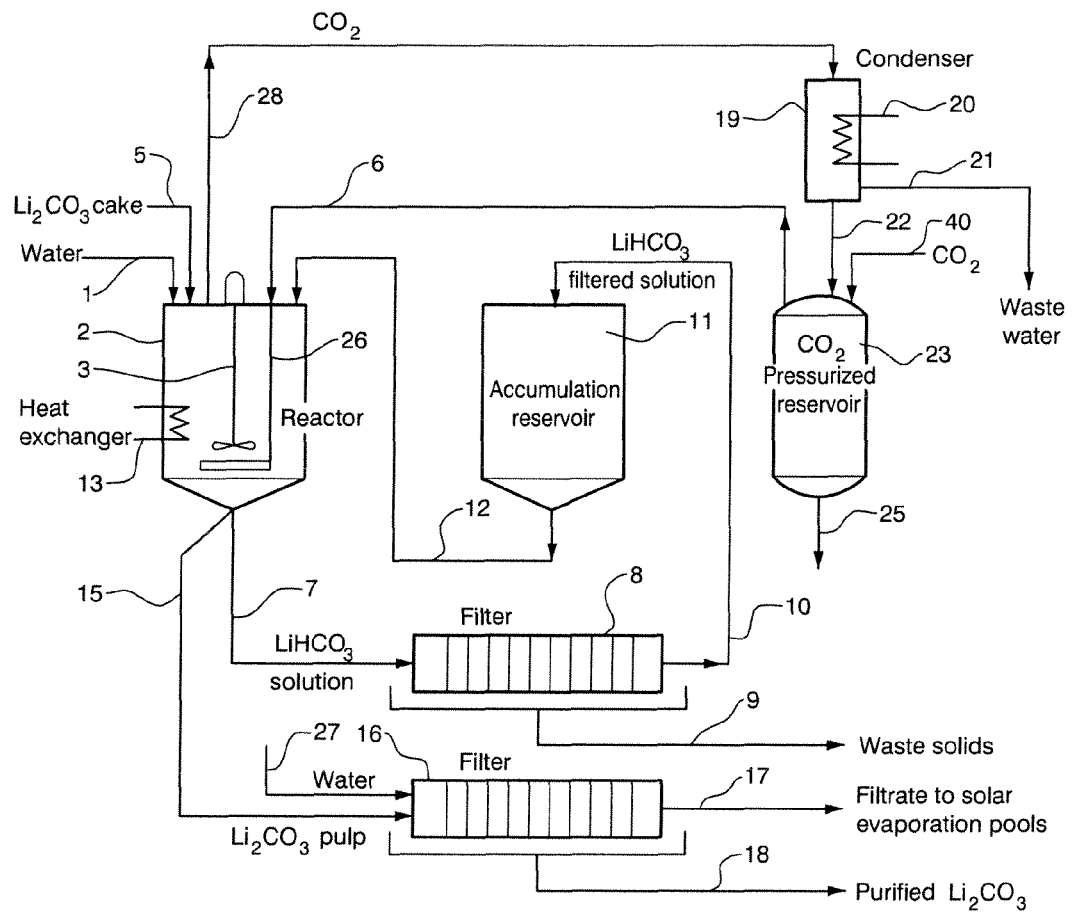
Figure No.2

METHOD FOR THE PRODUCTION OF BATTERY GRADE LITHIUM CARBONATE FROM NATURAL AND INDUSTRIAL BRINES

TECHNICAL FIELD

The present invention relates to a process that produces battery grade highly purified lithium carbonate from naturally occurring or industrial brines.

BACKGROUND OF THE INVENTION

Lithium, the 3rd element of the Periodic Table, the lightest metal and the 32nd most abundant in the earth's crust, is expected to play an important role in the rapid development of batteries for electric vehicles.

In the past few years a sustained increase in the use of lithium beginning with its use in pharmaceutical products in the early 20th century, to the present where it is used in manufacture of ceramics, glasses, aluminum products, synthetic rubber production, chemical products and alloys, as well as in the production of electric batteries. This latter application is expected to result in higher demands than all other uses by the mid 21st century.

Lithium can be obtained from various sources. One of them are brines as found in salt flats, salt water lakes, geysers and salt mines. The chemical composition of these brines varies greatly depending on the source. With respect to lithium, large differences in content as well as associated salts can be found. Table 1 shows some of the chemical compositions of brines from different parts of the world.

TABLE 1

| Chemical composition of naturally occurring brines (%). | | | | | | | |
|---|---|---|---|---|---|---|---|
| Origen | Li | Mg | Ca | Na | K | Cl | B |
| Silver Peak, USA | 0.02 | 0.02 | 0.71 | 6.3 | 0.8 | 10.1 | 0.005 |
| Dead Sea, Israel | 0.002 | 4.0 | 0.06 | 3.1 | 0.6 | 16.1 | 0.003 |
| Ocean (average) | 0.0001 | 0.12 | 0.04 | 1.05 | 0.04 | 1.92 | 0.0004 |
| Salar de Atacama, Chile | 0.15-0.20 | 1-1.4 | 0.04-1.5 | 5.7-7.2 | 1.7-1.9 | 16-17 | 0.04-0.05 |
| Salar de Cauchari, Argentina | 0.05 | 0.13 | 0.03 | 9.8 | 0.49 | 15.5 | 0.47 |

Spodumene, $(LiAl(SiO_3)_2)$, is an important mineral source of lithium and contains 3.73% lithium. Spodumene is a pyroxene (double aluminum and lithium silicate) and has been an important source material in the production of different lithium compounds and is the principle lithium mineral exported at present. Other minerals exploited commercially are: petalite $(LiAlSi_4O_{10})$ containing 2.27% lithium and lepidolite which has a variable composition. The latter two minerals are used as additives in glass and ceramic production but are not currently used as sources of lithium compounds or metallic lithium.

There are many other minerals that contain lithium, given that lithium is extremely reactive (having a lone electron in its outer layer) and can therefore form compounds with almost all the elements of the Periodic Table. Chlorides, bromides and fluorides of lithium are very soluble in water. Thus explaining that the lithium content of ocean water (10-4%) making it the potentially largest source of lithium in the world.

Treatment of brines obtained from salt flats and salt lakes vary considerably in accordance with their chemical composition. Generally, chloride brines contain significant quantities of magnesium that has to be removed before the lithium is precipitated. Depending on the end use of the lithium or lithium compound, other contaminants which must be removed are boron, calcium and sodium.

Battery grade lithium requires a sodium contamination level below $6\times10^{-4}$% due to the fact that that this metal can oxidize violently in the presence of oxygen, thus providing a risk of ignition. Magnesium must also be below $5\times10^{-3}$% due to the fact that this metal accumulates in the in the electrolyte during the process of electro-winning of lithium via electrolysis of melted salts, thereby short circuiting the cells. Metallic lithium is obtained by using a melted electrolyte containing 55% KCl and 45% LiCl at 800 to 850° C. while under an argon atmosphere.

As pointed out hereinabove, each particular lithium brine can require specific methods of purification. This has led to various processes for such purification. The majority of the patented processes for the chloride brines follow a protocol involving removal of boron via solvent extraction; dilution of the brine with mother liquor; a two stage magnesium precipitation; and final lithium precipitation in carbonate form.

For chloride brines such as one the ones found at the Salar de Atacama, in the north of Chile, U.S. Pat. No. 5,993,759 teaches a process for treatment of pre-concentrated lithium brines that have 5 to 7% lithium, 0.5% boron and 1 to 2.5% magnesium, these latter two elements being the primary contaminants. The described processes involve an initial step of boron removal via the use of solvent extraction. Solvents used in this step are solutions of various aliphatic alcohols in an aromatic solvent solution. The boron depleted brine solution are then diluted with mother liquor yielding a lithium brine containing 0.8-0.9% lithium. This dilution serves the purpose of avoiding excessive lithium precipitation given that the next step is magnesium carbonate ($MgCO_3$) using soda ash ($Na_2CO_3$). After the solid-liquid separation, a second magnesium precipitation using slaked lime ($Ca(OH)_2$) resulting in a magnesium hydroxide precipitate. The purified brine is then treated with soda ash at 80-90° C. in order to precipitate the lithium carbonate, a compound that posses a solubility inverse to temperature. The described process concludes with a filtration step followed by heated washing and subsequent drying.

This process, with some changes, has also been suggested for other brines. For example. U.S. Pat. Nos. 5,219,550 and 6,921.522 describe processes similar to the aforementioned one with additional steps that reduce levels of certain impurities, such as calcium and sodium.

Battery grade metallic lithium requires a high purity lithium chloride that can be produced from lithium carbonate or lithium hydroxide. Electrolyte grade lithium chloride requires low level of sodium (0.006%) and low magnesium (0.005%), yielding a lithium carbonate with 99.4% or greater purity.

Lithium carbonate obtained employing conventional methods as described in U.S. Pat. Nos. 5,993,759, 5,219,550, 4,261,960, 4,036,718 and 4,243,392 normally contain 99.2% $Li_2CO_3$ with 0.2 to 0.3% sodium and 0.05 to 0.1% magnesium, contamination levels that do not allow for use in the production of battery grade lithium.

There are several patented methods for the production of lithium chloride and lithium carbonate. For example, U.S. Pat. No. 4,980,136 describes a method for producing battery grade lithium chloride from lithium rich brines using solvent extractions with aliphatic alcohol, that is subsequently evaporated leaving high purity crystalline lithium chlorides. Other methods, as described in U.S. Pat. No. 4,859,343 teach the use of ion exchange columns that remove sodium ions from chloride brines.

Given that it is very difficult to produce lithium chlorides with less than 016% sodium directly from lithium carbonates, such carbonates are generally transformed into lithium hydroxide and then into lithium chloride or the lithium carbonate is treated with hydrochloric acid yielding lithium chloride that can be further purified via successive crystallizations. The described methods, even though requiring multiple steps, result in a lithium chloride product which is suitable for electrolysis, having a sodium level below 0.06%.

SUMMARY OF THE INVENTION

Removal of magnesium with calcium hydroxide before removal of boron is advantageous because one can thus avoid loss of lithium due to co-precipitation that occurs when one uses soda ash to precipitate magnesium away from the carbonate. This variant may be employed when the brine has been concentrated so that it contains 0.9 to 1.2% lithium. Moreover, not only is virtually all magnesium precipitated in the form of magnesium hydroxide, but also significant quantities of calcium in the form of gypsum ($CaSO_4.2H_2O$) and boron in the form of calcium borate ($CaB_2O_4.6H_2O$) thereby eliminating both boron and calcium from the sample.

Given that precipitation of magnesium with calcium hydroxide leaves virtually no amounts of this metal in the brine, it is unnecessary to have additional steps to remove magnesium nor is mother liquor required to be added to dilute the brine. As a result, it is possible to precipitate lithium carbonate absent significant quantities of boron and magnesium directly from brine. The lithium carbonate can then be further purified in order to reduce additional impurities, such as sodium and calcium thereby converting said lithium carbonate to bicarbonate of lithium ($LiHCO_3$) by adding carbonic acid ($H_2CO3$) produced from carbon dioxide ($CO_2$). One can then heat said bicarbonate of lithium solution in order to produce a highly purified lithium carbonate precipitate while the impurities remain in solution. Thus, this invention relates to a method for production of battery grade lithium carbonate by employing a conversion to bicarbonate of lithium and then back to lithium carbonate. Said method begins with precipitation of magnesium from brine using a gypsum solution ($Ca(OH)_2$) followed by an evaporation step where magnesium, calcium and boron containing compounds are precipitated. The magnesium depleted brine is subject to solvent extraction in order to remove any remaining boron. The resultant brine is then further purified by reaction with an aqueous solution of sodium carbonate, also known as soda ash ($Na_2CO_3$) at 80 to 100° C. in order to precipitate the lithium carbonate. After washing and filtering the lithium carbonate cake, said cake is re-dissolved in cold water saturated with $CO_2$ containing carbonic acid which reacts with the lithium carbonate to produce soluble bicarbonate of lithium. Said solution is then filtered and then heated in order to convert the bicarbonate of lithium into lithium carbonate which precipitates leaving the impurities in solution and generating $CO_2$ which can then be recirculated. The lithium carbonate pulp may then be filtered and said pulp can be washed and heated thereby producing purified batter grade lithium carbonate. All remaining solutions may then be returned to the solar evaporation pools.

BRIEF DESCRIPTION OF THE FIGURES

FIG. 1 describes a flowchart of the method for production of lithium carbonate in accordance with the present invention.

FIG. 2 describes the details of the method as well as the equipment requirements for the production of battery grade lithium carbonate in accordance with the present invention.

DESCRIPTION OF THE PREFERRED EMBODIMENTS

In order to provide a better understanding of the methods of the present invention, an illustrative embodiment is provided that is not meant to be limiting. FIGS. 1 and 2 will be referenced.

Brines with typical compositions, such as those obtained from the Salar de Cauchari in Argentina, see Table 2, are concentrated in evaporation pools in order to increase lithium content. Typical compositions for these brines are presented in Table 3.

TABLE 2

Typical chemical composition for brines from Salar de Cauchari.

| | Element | | | | | | | |
|---|---|---|---|---|---|---|---|---|
| | Li | Cl | Na | K | Ca | Mg | $SO_4^-$ | $H_3BO_3$ | $H_2O$ |
| % | 0.05 | 14.70 | 9.80 | 4.81 | 0.00 | 0.14 | 0.197 | 0.60 | 72.33 |

TABLE 3

Typical chemical composition for brines concentrated via solar evaporation from the Salar de Cauchari.

| | Element | | | | | | | |
|---|---|---|---|---|---|---|---|---|
| | Li | Cl | Na | K | Ca | Mg | $SO_4^-$ | $H_3BO_3$ | $H_2O$ |
| % | 0.39 | 12.70 | 5.41 | 2.70 | 2.52 | 9.91 | 5.92 | 2.53 | 55.42 |

In FIG. 1, brine 1, as described in Table 2, is mixed and allowed to react with a saturated slacked lime ($Ca(OH)_2$) 2 solution, in a conventional reactor 3 such as a reaction chamber with stirrer, in quantities sufficient to provoke the precipitation of all magnesium chloride and sulfates present in said brine, in accordance with the following formulas:

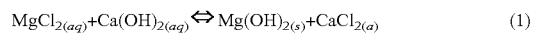

$$MgCl_{2(aq)} + Ca(OH)_{2(aq)} \Leftrightarrow Mg(OH)_{2(s)} + CaCl_{2(a)} \quad (1)$$

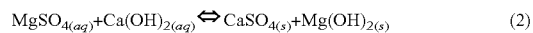

$$MgSO_{4(aq)} + Ca(OH)_{2(aq)} \Leftrightarrow CaSO_{4(s)} + Mg(OH)_{2(s)} \quad (2)$$

$$Na_2SO_{4(aq)} + Ca(OH)_{2(aq)} \Leftrightarrow CaSO_{4(s)} + 2NaOH_{(aq)} \quad (3)$$

The NaOH produced in reaction (3) also reacts with the $MgCl_2$ to form $Mg(OH)_2$ in accordance with the following reaction:

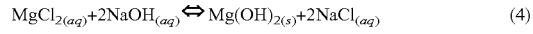

$$MgCl_{2(aq)} + 2NaOH_{(aq)} \Leftrightarrow Mg(OH)_{2(s)} + 2NaCl_{(aq)} \quad (4)$$

All these reactions are spontaneous, given that the standard reaction free energies, in a wide spectrum of temperature, are negative. For example, at 20° C. $\Delta G_1°=-21,4$ kcal; $\Delta G_2°=-27,0$ kcal; $\Delta G_3°=-27,1$ kcal; $\Delta G_4°=-43,2$ kcal respectively. Using this method, the magnesium is virtually all removed from the brine given that the product solubility value $K_{ps}$ for magnesium hydroxide is very low, only $5.61\times10^{-12}$.

The pulp 4 formed is then subjected to a solid/liquid separation method 5 such as thickening and filtration in order to obtain a brine depleted in magnesium 7; as well as depleted in salts $Mg(OH)_2$ and $CaSO_4.2H_2O$ 6. The filtered brine 7 is then concentrated via solar evaporation in pools 8 where additional salts are precipitated 9 such as brucite $Mg(OH)_2$, gypsum $CaSO_4.2H_2O$, calcium borate $CaB_2O_4.6H_2O$ and halite NaCl. Concentrated brine 10 having 0.8 to 1.2% lithium content is then subjected to a solvent extraction protocol 14 that removes residual boron. Table 4 teaches a typical formulation for concentrated brine via solar evaporation obtained from the Salar de Cauchari that is then subjected to the solvent extraction protocol.

TABLE 4

Typical chemical composition of concentrated brine from the Salar de Cauchari that is then subjected to the solvent extraction protocol.

| Element | | | | | | | | |
|---|---|---|---|---|---|---|---|---|
| Li | Cl | Na | K | Ca | Mg | $SO_4^-$ | B | $H_2O$ |
| 0.72 | 14.20 | 6.86 | 4.20 | 0.016 | 0.008 | 2.97 | 0.70 | 70 |

(% row)

At this stage, the brine's pH is lowered from 11 to 7 with hydrochloric acid and then subjected to a solvent extraction protocol 14, in order to remove residual boron, involving one or more extraction steps using an aliphatic alcohol, such as isooctyl alcohol 11, and 5 to 20% by volume of a phase modifier, such as tributylphosphate 12, that is dissolved in an aromatic solvent, such as Escaid 100, with an extraction ratio between 1/10 and 10/1, a 1 to 120 minute phase modification incubation time, a 0 to 50° C. incubation temperature and employing an organic/brine ratio of 6/1 to 1/5 with a pH between 1 and 7 as measured in a 1/10 brine in water dilution. The organic extract is then subjected to a conventional re-extraction involving one or more stages using an alkaline solution 13 such as sodium hydroxide at a concentration ranging from 0.01 to 3 moles/L, using an organic/aqueous ratio between 1/5 and 5/1, an incubation period of between 1 to 60 minutes and a phase separation total time of between 1 to 120 minutes, at a temperature between 0 to 51C. The resultant alkaline solution 15 from the solvent extraction protocol 14 contains boron in the form of sodium borate $Na_2B_4O_7$ and can then be collected in the solar evaporation pools.

Boron depleted brine 16, having boron content below 0.001%, is then heated to between 70 to 100° C. in a conventional heat exchange unit 18. The heated brine 42 is sent to the lithium carbonate precipitation stage 20 where it is allowed to react with an aqueous solution having a 20 to 30% by weight soda ash (sodium carbonate, $Na_2CO_3$) 19 content, at a pH between 8 and 12. The reaction is carried out in one or more conventional containers with stirrers and thermally insulated for a period of between 5 and 150 minutes, at a temperature of between 70 and 100° C., given that lithium carbonate has a solubility in inverse proportion to the temperature, i.e. 7.2 g/L at 100° C. and 15.4 g/L at 0° C.

The reaction that occurs at step 20 can be described as follows:

$$2LiCl_{(aq)}+Na_2CO_{3(aq)} \Leftrightarrow Li_2CO_3+2NaCl_{(aq)} \quad (5)$$

The heated pulp 21 at 70 to 100° C. is then subjected to a solid/liquid separation 23 such a thickening and filtration, while maintaining the temperature of the pulp and the lithium carbonate cake at between 50 to 95° C. The lithium carbonate cake $Li_2CO_3$ is then washed with demineralized water 22 at a temperature between 50 to 95° C.

The filtrate and the water used in washing 41 are returned to the solar evaporation pools in order to further precipitate other salts such as halite, NaCL. The concentrated brine 17 obtained from the solar evaporation pools is returned to the heat exchanger 18 along with the concentrated brine 16 in order to recover the lithium content. The lithium carbonate cake 24 is subsequently dissolved in cold demineralized water 0 to 30° C.

As mentioned herein above, at 0° C. the solubility of lithium carbonate is 15 g/L. The conversion of lithium carbonate to bicarbonate of lithium and the stage in which this carbonate is decomposed along with the requisite equipment are described in detail herein below. The lithium carbonate is dissolved within a conventional incubator 25 with stirring for a period of time between 1 and 120 minutes. Said incubator 25 is equipped with a conventional gas diffuser allowing for carbon dioxide ($CO_2$) 26 to be injected into the reaction chamber at a pressure of between 1 and 5 atmospheres thus allowing for reaction with water to yield carbonic acid ($H_2CO_3$) which in turn reacts with lithium carbonate to form bicarbonate of lithium, in accordance with the following formulas:

$$CO_{2(g)}+H_2O_{(l)} \Leftrightarrow H_2CO_{3(aq)} \quad (6)$$

$$H_2CO_{3(aq)}+Li_2CO_{3(aq)} \Leftrightarrow 2LiHCO_{3(aq)} \quad (7)$$

Bicarbonate of lithium has much greater solubility than lithium carbonate, 58 g/L at 0° C. or 52 g/L at 10° C.

Solution 27 containing dissolved bicarbonate of lithium is subsequently filtered with a conventional filter 43 such as a filter press. The filtered solution 44 is then fed into a reactor 29 where it is heated with a conventional heat exchanger 30 located inside the reactor in order to heat said filtered solution to a temperature between 50 to 100° C., conditions in which the lithium carbonate decomposes and yields carbon dioxide 28 which can in turn be recirculated. The reaction that occurs is described as follows:

$$2LiHCO_3 \Leftrightarrow Li_2CO_{3(s)}+CO_{2(g)}+H_2O_{(g)} \quad (8)$$

Above 50° C., carbonic acid has low solubility, a mere 0.01 g/L at 95° C. All the contaminants which accompany the lithium carbonate 24, such as sodium chloride NaCL, calcium chloride $CaCL_2$ and residual sulfates remain in solution.

Pulp 31 which is generated and contains purified precipitated lithium carbonate is then subjected to a conventional solid/liquid separation step 32 such as thickening and filtering while maintaining the lithium carbonate pulp at a temperature between 50 to 95° C. The purified lithium carbonate cake is subsequently washed one or more times with demineralized water 33 at a temperature ranging from 50 to 95° C. The filtrate along with the water used in washing are sent to the solar evaporation pools 38 in order to further precipitate impurities 39 and concentrate the brine which is then recirculated in order to recover the remaining lithium 17. The purified lithium carbonate cake 34 is then dried at a temperature from 150 to 250° C. in conventional equipment 36 such as an indirect heating, rotating oven allowing for collection of battery grade lithium carbonate 37.

FIG. 2 teaches a schematic of the steps in the purification of lithium carbonate, showing the operation and principle equipment involved. Prior to the addition of lithium carbonate to the reactor 2 demineralized water 1 is added to reactor 2 at a temperature between 0 and 30° C. The lithium carbonate cake 5 is then added to reactor 2 which is a conventional reactor having a conventional stirrer 3, and in which carbon dioxide 6 is injected at a pressure of 1 to 5 atmospheres through the use of a conventional diffuser 26, such as a perforated plate or a porous plate, for a reaction time from 1 to 120 minutes so that the carbon dioxide becomes dissolved and forms carbonic acid which continues to react with the dissolved lithium carbonate to form bicarbonate of lithium, more soluble than lithium carbonate, in accordance with formula (7), until the concentration of bicarbonate of lithium in solution reaches a value of between 1 to 58 g/L.

Once the capacity to dissolve the bicarbonate of lithium is reached (saturation levels), for example, 52 g/L at 15° C., the solution containing the bicarbonate of lithium 7 is filtered with a filter press or other conventional filter to remove insoluble impurities 9 which can then be discarded.

Filtrate 10, containing the bicarbonate of lithium, is continuously accumulated in a conventional storage tank 11. Once solution 7 has been filtered, the filtered solution 12 is transferred from storage tank 11 to reactor 2. Any vapor or other heating fluid is sent to a conventional heat exchanger 13 located in the interior of reactor 2 for a period of time ranging from 1 to 120 minutes in order to heat the bicarbonate of lithium solution to a temperature ranging from 50 to 100° C. in order to decompose the bicarbonate of lithium to lithium carbonate in accordance with reaction (8), given that bicarbonate of lithium is unstable at temperatures above 50° C., breaking down and generating carbon dioxide and precipitating purified lithium carbonate. Pressure inside reactor 2 is maintained at 1 to 5 atmospheres for a period of time ranging from 1 to 120 minutes.

The resultant pulp 15 is maintained at a temperature ranging from 50 to 95° C. and is filtered at that temperature in a conventional filter 16, such as a filter press, wherein the lithium carbonate cake is washed with 1 or more volumes of demineralized water 27 at a temperature ranging from 50 to 95° C. Both the filtrate and the water used in washing 17 are sent to solar evaporation pools for concentration and subsequent recuperation of the lithium. The lithium carbonate cake 18 is sent to a drying stage at a temperature ranging from 100 to 250° C. for a drying time ranging from 1 to 120 minutes in a conventional indirect heater.

Gaseous carbon dioxide 28 generated during the breakdown of bicarbonate of lithium in reactor 2 is directed to a conventional condenser in order to condense water generated during said breakdown of bicarbonate of lithium in accordance with formula (8). Condensed water 21 may be discarded; and carbon dioxide 22, separated in the cooler section, may be recirculated to the pressurized tank 23. Additional water carried by the gas 25 may be drained occasionally from tank 23. Additional carbon dioxide 40 may also be directed to tank 23 in order to maintain the balance of mass and to compensate for any losses of gas.

EXAMPLE OF AN EMBODIMENT OF THE INVENTION

A concentrated brine obtained from the Salar de Cauchari, Argentina, having a chemical composition as described in Table 5 was treated with saturated lime (Ca(OH)$_2$) while maintaining the pH at 11 and at a temperature of 10° C. for 30 minutes.

TABLE 5

Chemical composition of concentrated brine obtained from the Salar de Cauchari

| | Element | | | | | | | |
|---|---|---|---|---|---|---|---|---|
| | Li | Cl | Na | K | Ca | Mg | SO$_4^-$ | B | H$_2$O |
| % | 0.410 | 12.810 | 5.423 | 2.721 | 2.482 | 9.931 | 5.936 | 0.445 | 55.423 |

The lime treated brine was subsequently concentrated in solar evaporation pools whereupon Mg(OH)$_2$, CaSO$_4$.5H$_2$O and CaB$_2$O$_4$.6H$_2$O were crystallized. The chemical composition of the resultant brine in presented in Table 6.

TABLE 6

Chemical composition of concentrated lime treated brine from the Salar de Cauchari

| | Element | | | | | | | |
|---|---|---|---|---|---|---|---|---|
| | Li | Cl | Na | K | Ca | Mg | SO$_4^-$ | B | H$_2$O |
| % | 0.719 | 14.220 | 2.856 | 4.199 | 0.016 | 0.008 | 2.967 | 0.698 | 74.183 |

The brine described in Table 6, having a boron content of 0.698% by weight was treated with 25% by weight hydrochloric acid in order to maintain the pH of the brine at a value of 4. The brine was then subjected to a solvent extraction using 85% by volume iso-octylic acid and 15% by volume tributyl phosphate as a phase modifier, dissolved in the commercial aromatic solvent Escaid 100 in a ratio of 20% by volume of the extractant and 80% by volume of the solvent. The brine underwent four extraction steps using an organic/brine ratio of 4/1 for 4 minutes in each step and allowing phase separation to proceed for 15 minutes in each step. The resultant brine after the solvent extraction steps contained 0.004% residual boron.

The loaded organic phase was then treated with a 0.25 molar sodium hydroxide alkaline solution using an organic/aqueous ratio of 3/1 in three re-extraction steps each lasting 5 minutes followed by an 8 minute phase separation period for each step. The alkaline solution, containing 1.36% boron was sent to the solar evaporation pools and the boron depletes organic phase was recirculated into the process.

The boron depleted brine was subsequently treated with a 25% by weight soda ash (Na$_2$CO$_3$) solution while maintaining the pH at 10.5 and the temperature at 90 to 95° C. for a reaction time of 50 minutes. The resultant pulp was thickened under heat, 85 to 90° C., and then the thickened pulp was filtered under heat at 80 to 85° C. using a filter press. The lithium carbonate cake produced was then washed in the filter with 2 volumes of demineralized water at 95° C.

Both the filtrate and the water used in washing were then sent to the solar evaporation pools while the lithium carbonate cake was then continuously fed via a rotating star seal valve into a tank, which had a stirrer, filled with demineralized water at 10° C. through which carbon dioxide was bubbled using a pressurized storage tank connected to a metallic gas diffuser located at the bottom of the reaction tank in order to form carbonic acid. The pressure with the reaction tank was maintained at 1.5 atmospheres and the reaction was allowed to proceed until the bicarbonate of lithium solution reached 52 g/L. The bicarbonate of lithium solution was then filtered using a press filter and the clear filtrate was continuously collected in a collection tank. Once the bicarbonate of lithium solution was filtered it was then re-fed into the reaction tank and was forced to pass through a heat exchanger located within the reaction tank. The solution was under constant stirring at 50 RPM. Once the solution reached 95° C., the temperature was maintained at that level for 30 minutes. The water vapors along with carbon dioxide generated were passed through a tube condenser in order to condense and separate the water from the carbon dioxide, which was then returned to the pressurized $CO_2$ tank.

The resultant pulp containing the lithium carbonate was thickened under heat at 85 to 90° C. and the resultant dense pulp was washed with two volumes of demineralized water at 95° C. The filtrate and the water used in washing were sent to the solar evaporation tanks. The purified lithium carbonate was dried at 180° C. for 35 minutes in an indirect dryer. The resultant battery grade lithium carbonate had the composition described in Table 7.

TABLE 7

Purified battery grade lithium carbonate.

| | Element | | | | | | |
|---|---|---|---|---|---|---|---|
| | Li | $Li_2CO_3$ | Na | K | Cl | Mg | Ca | B |
| % | 18.71 | 99.51 | 0.00003 | 0.00001 | 0.002 | 0.0004 | 0.001 | 0.003 |

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method for producing battery grade lithium carbonate starting with brine solutions from natural or industrial sources comprising the following steps:
    addition of calcium hydroxide to brine in order to precipitate magnesium, calcium and boron; concentrating the treated brine by solar evaporation in order to precipitate and separate magnesium hydroxide, pentahydrated calcium sulfate and heptahydrated calcium borate generating a magnesium depleted brine;
    treating said magnesium depleted brine with an organic solvent in order to remove residual boron and yielding a boron depleted brine;
    adding sodium carbonate to said boron depleted brine in order to precipitate the lithium carbonate;
    collecting said lithium carbonate to form a lithium carbonate cake;
    reacting said lithium carbonate cake with carbonic acid produced by reacting carbon dioxide gas with water in order to form bicarbonate of lithium;
    separating the bicarbonate of lithium in solution from insoluble impurities contained in said lithium carbonate;
    heating said bicarbonate of lithium solution in order to convert into a lithium carbonate precipitate;
    separating said lithium carbonate precipitate from said bicarbonate of lithium solution; and drying said lithium carbonate precipitate.

2. A method according to claim 1 wherein said magnesium depleted brine contains less than 0.001% by weight magnesium and between 0.8 and 1.2% by weight lithium.

3. A method according to claim 1 wherein said organic solvent for treating said magnesium depleted brine includes isooctyl alcohol dissolved in a commercial solvent,
    the step of treating the magnesium depleted brine involves one or more extraction steps,
    the ratio of the organic solvent to the brine in the step of treating the magnesium depleted brine is 1/5 to 6/1, and
    the step of treating the magnesium depleted brine includes an incubation period of between 1 to 60 minutes and a total phase separation time ranging from 1 to 120 minutes at a temperature ranging from 0 to 50° C. at a pH between 1 and 7; and
    further comprising adding, as a phase modifier, 5 to 20% volume tributylphosphate with respect to the organic solvent; and
    re-extracting boron from the charged organic phase, in one or more steps, with a 0.01 to 3 moles/L solution of sodium hydroxide for an incubation period of time ranging from 1 to 60 minutes and a total phase separation time ranging from 1 to 120 minutes at a temperature ranging from 0 to 50° C. in order to produce a boron depleted brine.

4. A method according to claim 1 wherein said boron depleted brine is made to react with a 20 to 30% by weight aqueous solution of sodium carbonate at a pH ranging from 8 to 12, at a temperature ranging from 70 to 170° C. for a period of time ranging from 5 to 150 minutes, in one or more steps, in order to produce a lithium carbonate precipitate.

5. A method according to claim 1 wherein said lithium carbonate precipitate is subjected to a solid/liquid separation via thickening and filtration while maintaining the temperature between 50 and 95° C. in order to produce a lithium carbonate cake that is then washed with one or more volumes of demineralized water at a temperature between 50 to 95° C.

6. A method according to claim 1 wherein said lithium carbonate cake is reacted with a saturated carbonic acid solution generated by dissolving carbon dioxide at a pressure ranging from 1 to 5 atmospheres in demineralized water at a temperature ranging from 0 to 30° C. for a reaction time ranging from 1 to 120 minutes in order to form a bicarbonate of lithium solution with a concentration ranging from 1 to 58 g/L.

7. A method according to claim 1 wherein said bicarbonate of lithium solution is filtered in order to remove insoluble impurities.

8. A method according to claim 7 wherein said filtered bicarbonate of lithium solution is heated to a temperature ranging from 50 to 100° C. for a reaction time ranging from 1 to 120 minutes at a pressure ranging from 1 to 5 atmospheres in order to break down said bicarbonate of lithium into a purified lithium carbonate.

9. A method according to claim 1 wherein said lithium carbonate precipitate is thickened and then filtered maintaining the temperature of said thickened and filtered lithium carbonate precipitate at a temperature ranging from 50 to 95° C. and washing said purified lithium carbonate cake with one or more volumes of demineralized water at a temperature ranging from 50 to 95° C.

10. A method according to claim 1 wherein said lithium carbonate cake is dried in a dryer at a temperature ranging from 100 to 250° C. for a period of time ranging from 1 to 120 minutes.

11. A method according to claim 3 wherein a boron containing solution derived from said re-extraction step is sent to solar evaporation pools.

12. A method according to claim 5 wherein a filtrate and water used in the washing step are sent to solar evaporation pools.

13. A method according to claim 8 wherein carbon dioxide is generated when said filtered bicarbonate of lithium solution is heated, and the carbon dioxide is recirculated to the step of reacting carbon dioxide gas with water in order to form bicarbonate of lithium.

14. A method according to claim 9 wherein a filtrate and water used in the washing step are sent to solar evaporation pools.

* * * * *